United States Patent
Johnston et al.

[15] 3,681,504
[45] Aug. 1, 1972

[54] RUMINANT DEGLUTITION ALTERATION

[72] Inventors: Charles Johnston; Michael D. Campbell, both of Midland, Mich.

[73] Assignee: The Dow Chemical Company, Midland, Mich.

[22] Filed: Dec. 26, 1968

[21] Appl. No.: 787,220

[52] U.S. Cl. .................................................424/326
[51] Int. Cl. ............................................A61k 27/00
[58] Field of Search ......................................424/326

[56] References Cited

OTHER PUBLICATIONS

Ueda-Chem. Abst. Vol. 59 (1963) page 14112a
Armstrong-Chem. Abst. Vol. 51 (1957) page 2552b
King-Chem. Abst. Vol. 57 (1962) pages 15564h & 15565
Taylor-Chem. Abst. Vol. 55 (1961) pages 27377i & 27378

*Primary Examiner*—Sam Rosen
*Attorney*—Griswold & Burdick, Maynard R. Johnson and John L. Spalding

[57] ABSTRACT

A method and composition useful for altering deglutition in ruminants by closure of the esophageal groove therein are disclosed. In the method and composition, guanidine, 1-aminoguanidine, 1,3-diaminoguanidine or a pharmaceutically-acceptable salt thereof are employed to close the esophageal groove of a ruminant animal, thereby permitting orally-ingested nutrients and medicaments to bypass the reticulo-rumen.

14 Claims, No Drawings

RUMINANT DEGLUTITION ALTERATION

BACKGROUND OF THE INVENTION

The Ruminantia, that is, the ruminants, such as sheep, cattle and goats, have the ability to consume and utilize cellulosic feedstuffs which are of negligible value to monogastric animals such as dogs, cats, monkeys and the like. This is possible because of the pre-gastric fermentation processes occuring in reticuloreumen compartments of the ruminant animal's stomach. Such pre-gastric fermentation processes convert these feedstuffs into nutrients which can, upon subsequent passage to other parts of the digestive system, be utilized by the animal. Unfortunately, feedstuffs which could be better utilized without pre-gastric fermentation also enter the same processes in the ruminant animal as do feedstuffs of negligible value, resulting in the loss of nutrients.

In the ruminant animal, ingested food passes from the esophagus to the reticulo-rumen for pre-gastric fermentation, then to the omasum and abomasum before entering the small intestine. The stomach of the ruminant is divided into four compartments; reticulum, rumen, omasum and abomasum. The reticulum and rumen are joined by a fold of tissue, so that ingesta flows freely from one to the other. Most of the microbial activity of pre-gastric fermentation takes place in the reticulo-rumen. The function of the abomasum appears to be similar to the simple stomach of the monogastric species. The function of the omasum has not been clearly defined.

In young suckling ruminant animals the esophageal groove, a continuation of the esophagus as a groove or tube which bypasses the reticulo-rumen area, functions to bypass milk from the esophagus to the reticulo-omasal orifice where it enters the omasal-abomasal compartments. As the ruminant animal becomes older and changes from a liquid to a solid diet, the reticulo-rumen develops and pre-gastric fermentation begins. The esophageal groove mechanism of bypassing the reticulo-rumen area then diminishes and deglutition alters so that all ingested materials pass first into the reticulo-rumen area rather than the omasal-abomasal compartments.

Not only do cellulosic feedstuffs enter reticulo-rumen area and undergo pre-gastric fermentative processes, but medicaments and nutrients such as simple sugars, essential amino acids, peptides and proteins also undergo the same processes resulting in a partial or complete loss of their activity. For example, anthelmintic medicaments such as tetrachloroethylene and nicotine sulfate are so degraded in the reticulo-rumen as to be of little use in treating ruminant animals. Supplemental nutrients such as glucose, fat soluble vitamins, lysine, methionine, cysteine, cystine and other protein, peptide and amino acid nutrients are so degraded by the microflora of the pre-gastric fermentation processes in the recticulo-rumen that they are of little or no value as dietary supplements for ruminants. Riek, Australian Vet. Jour. *30*: 29 (1954); McDonald, Biochem. J., *42*: 584 (1948); Marston, Aust. J. Exp. Biol. Med. Sci. *9*: 235 (1932); Dutoit et al., J. Vet. Sci., *4*: 229 (1935); Reis et al., Australian J. Agr. Res. *12*: 335 (1961); Australian J. Biol. Sci. *16*: 218 (1963); and Australian J. Biol. Sci. *17*: 532 (1964); and Reis, Australian J. Biol. Sci. *20*: 809 (b1967).

Various procedures for stimulating the growth of reticulo-rumen microflora are known. Amidines, including guanidine, are known to be useful as sources of usable nitrogen for the rumen microflora of Ruminantia, and have been shown to enhance the growth of such microflora in vitro, U.S. Pat. No. 2,630,386.

There is a need for a simple method and composition which will alter the deglutition process in ruminants so that orally ingested materials susceptible to degradation by rumen microflora are protected therefrom and shunted to the omasal-abomasal compartments.

SUMMARY OF THE INVENTION

The present invention is directed to the modification of the deglutition processes in ruminant animals whereby orally ingested materials are shunted to the omasal-abomasal compartments of the ruminant animal stomach, substantially bypassing the reticulo-rumen compartments. More particularly, the invention is directed to a process in which the esophageal tissues of a ruminant animal are subjected to the action of one or more compounds selected from guanidine, 1-aminoguanidine, 1,3-diaminoguanidine and the pharmaceutically acceptable salts thereof in an amount sufficient substantially to close the esophageal groove of the animal. Such closure of the esophageal groove substantially prevents entry of swallowed or orally ingested material into the reticulo-rumen, thus bypassing the reticulo-rumen and shunting such material to the omasal-abomasal compartments for utilization by the ruminant animal. The invention thus includes a procedure useful for the oral administration to animals of effective amounts of rumen-degradable or rumen-insensitive, gastrically utilizable materials, the procedure comprising exposing the esophageal tissues of a ruminant animal to sufficient of one of the active compounds of the invention to substantially close the esophageal groove thereof, and orally administering to the animal a rumen-degradable or rumen-insensitive, gastrically utilizable substance while the esophageal groove is substantially closed.

The guanidine, 1-aminoguanidine and 1,3-diaminoguanidine active compounds employed in the method of the invention are well known compounds which have no substantial adverse effects on ruminant animals when employed at dosages consistent with good esophageal groove-closing activity. The term "esophageal tissues," as employed in the present specification and claims, means and refers to the tissues of the esophagus and of the oral cavity at or near the esophagus, and is inclusive of those tissues of the esophagus and of the rear portions of the oral cavity which are contacted by material which is swallowed or about to be swallowed during the normal processes of deglutition. The esophageal tissues of the ruminant animal can be exposed to the action of the active compounds by a suitable procedure such as oral administration in the form of solid or liquid compositions, by mixing the active compounds with dry or liquid animal feed, or feed supplements, or by liquid drenching procedures. The active compounds are preferably employed in the form of a pharmaceutically acceptable salt thereof, and pharmaceutically acceptable salts of guanidine or 1-aminoguanidine are particularly preferred.

As employed herein, the phrase "pharmaceutically acceptable salts" refers to non-toxic salts of the active compounds, the anions of which are relatively innocuous to the ruminant animal at dosages consistent with good esophageal groove-closing activity so that the beneficial effects of the compounds are not vitiated by side effects ascribable to the anions. Appropriate pharmaceutically acceptable salts include those derived from mineral acids such as hydrochloric, hydrobromic, carbonic, phosphoric, sulfuric, chromic and nitric acids and from organic acids such as acetic, lactic, maleic, succinic, fumaric, glutaric, citric, malic and tartaric acids and the like. The hydrochloride salts are preferred.

The term "rumen-degradable, gastrically utilizable substance," as employed in the present specification and claims, means and refers to those substances such as medicaments, including antiparasitic agents and pharmacologically active agents, and nutrients, including simple sugars and essential amino acid sources, which are of substantial benefit to the ruminant animal either nutritionally or in treatment of infection or the like if administered through the omasal-abomasal compartments, but which are substantially reduced in efficacy by passage through the reticulo-rumen when administered orally. Representative rumen-degradable, gastrically utilizable substances include medicaments such as tetrachloroethylene, nicotine sulfate, and bacitracins; and nutrients, such as sugars, including glucose, fructose, sucrose, maltose, lactose and the like; fat soluble vitamins, such as vitamin A, vitamin D, vitamin E and vitamin K; and sources of essential amino acids. The term "essential amino acid source," as employed herein, refers to materials which supply amino acids essential in ruminant metabolism, and including the amino acids themselves such as lysine, methionine, cystine, cysteine, tryptophan, arginine, threonine, or glycine as well as digestible peptides, polypeptides, and proteins containing the same.

The rumen-insensitive, rumen-insensitive, gastrically utilizable substance," as employed in the present specification and claims, means and refers to those substances which are absorbed into the animal system from the omasal-abomasal compartments rather than from term " the reticulo-rumen. Such substances are of substantial benefit to the ruminant animal either nutritionally or in treatment of infection or the like if administered through the omasal-abomasal compartments, but are not absorbed in substantial amounts directly from the reticulo-rumen. Consequently, the beneficial properties of such substances are not ordinarily utilizable by ruminant animals immediately following oral administration thereof, utilization by the animal being delayed by as much as 72 to 96 hours while the substance passes through the reticulo-rumen. Certain rumen-insensitive, gastrically utilizable substances, notably antibiotics such as the tetracyclines including tetracycline, chlortetracycline and oxytetracycline, chloramphenicol, erythromycin, penicillins, and tylosin, are not only delayed in action by passage through the reticulo-rumen, but have a temporary detrimental effect on ruminant digestion due to their suppression of rumen microflora.

The method and composition of the invention are of particular value in the oral administration of rumen-degradable, gastrically utilizable substances to ruminants, since the invention permits the animal to make physiological use of substances which otherwise would be rendered of little value to the animal. The invention can also be employed to advantage in the oral administration of substances which can be utilized by the animal when received in the omasal-abomasal compartments regardless of whether the substance passes through the reticulo-rumen or not. In this event, rumen-insensitive gastrically utilizable substances arrive in the omasal-abomasal compartment substantially sooner after administration, thus substantially eliminating the time normally spent in the reticulo-rumen before the substance can be utilized by the animals. It is essential, however, that the method of the invention not be practiced while the animal is being orally administered substantial amounts of substances which are not utilizable by the animal without pre-gastric fermentation in the reticulo-rumen. Since the practice of the present method results in closure of the esophageal groove and shunting of substantial amounts of orally consumed materials directly to the omasum-abomasum and bypassing the reticulo-rumen, substances normally requiring pre-gastric fermentation can be reduced in effectiveness. Consequently, the materials utilized by pre-gastric fermentation, such as cellulosic feedstuffs, hay, grass and the like, should be fed a sufficient time after the treatment with the guanidine and 1-aminoguanidine compounds for the esophageal groove to re-open and for substantially normal deglutition to be resumed.

Whether or not a particular substance is a rumen-degradable, gastrically-utilizable substance or a rumen-insensitive, gastrically-utilizable substance suitable for use in the method of the invention can be readily determined by known procedures. For example, routine comparisons can be carried out between oral administration via conventional and normal deglutition, involving passage through the reticulo-rumen, and administration directly into the omasum-abomasum by the method of the invention or by cannulation, administration through fistulae or the like.

The exposure of the esophageal tissues of a ruminant to the action of an amount of guanidine, 1-aminoguanidine, 1,3-diaminoguanidine or a pharmaceutically acceptable salt thereof sufficient to bring about substantial closure of the esophageal groove is critical and essential to the practice of the present invention. Expressions such as "sufficient to close substantially the esophageal groove" and "esophageal-groove-closing amount" are employed in the present specification and claims to designate that amount of active compound which is sufficient to induce substantial closure of the esophageal groove as indicated by the shunting to the omasum-abomasum or bypassing of the reticulo-rumen of substantial amounts of substances ingested simultaneously with, or within a short time after, the administration of the guanidine or aminoguanidine compound. Whether or not sufficient of an active compound is employed and whether or not the particular procedure employed exposes the esophageal tissues to sufficient active compound under particular circumstances can be ascertained by conventional testing procedures such as administration of glucose and analysis of blood sugar levels, or administration or a dye such as Congo red followed by necropsy to determine the location of the major amount of the dye.

The amount of active compound to be administered to a ruminant animal can vary depending upon such factors as the particular compound or salt employed, the size, weight, age and species of ruminant animal treated, the time of administration, whether or not the compound is administered in a solid feed supplement composition or in a liquid composition such as in liquid diet supplements in drinking water or as a drench, and the particular effects desired to be produced, that is, whether it is desired only to provide a desired closure of the esophageal groove for a short period of time such as in oral administration of medicaments, or whether substantially continuous bypassing of the reticulo-rumen is desired for longer periods, as in the feeding of low-cellulose, high sugar, high protein and amino acid diets and supplements.

In general, the compounds are administered in liquid solution or dispersion or in a solid form adapted to be readily dispersed or dissolved in the oral secretions of the ruminant prior to deglutition. Oral administration of the compounds in such compositions provides for spreading and dispersal of the dose of compound over the esophageal tissues of the animal as the composition moves from the oral cavity and into the esophagus during deglutition or drenching. In contrast, oral administration of the active compounds in compacted or non-dispersible form, such as the oral administration of the compounds in tablets, boluses, gelatin capsules, pills or the like, which are swallowed whole, prevents the exposure of the esophageal tissues to the action of the compounds and results in no alteration from the normal deglutition process. In such cases, the non-dispersible composition is carried to the reticulo-rumen. Excellent results in alteration of ruminant deglutition are obtained when the active compounds are administered in the form of orally ingestable compositions containing from about 0.005 to about one to about two percent by weight of guanidine, 1-aminoguanidine, 1,3-diaminoguanidine or a pharmaceutically acceptable salt thereof. Such compositions can be administered in amounts sufficient to provide from about 0.5 or less to about 1,000 or more milligrams of compound per pound of animal body weight, with excellent results being obtained when the compounds are administered at oral dosage rates of from about 0.5 to about 10, to about 25 milligrams per pound. Oral administration of such amounts of the compounds, either in finely divided dispersible solid form or in liquid solution provides substantial closure of the esophageal groove persisting for about 2 to 5 minutes following a single dose. Oral administration of gastrically utilizable substances, either simultaneously with the guanidine or mono- or diaminoguanidine compound or within about 2 to about 5 minutes after administration of an active compound results in shunting of such substances to the omasum-abomasum and bypassing of the reticulo-rumen.

The method of the invention is preferably carried out by the oral administration to a ruminant animal of a composition comprising an esophageal-groove-closing amount of one or more of guanidine, 1-aminoguanidine, 1,3-diaminoguanidine and the pharmaceutically acceptable salts thereof in intimate admixture with one or more rumen-degradable, gastrically utilizable substance or rumen-insensitive, gastrically utilizable substance. Such compositions preferably contain only minor amounts, such as less than about 15 percent by weight of cellulosic materials or other substances utilized only by pre-gastric fermentation. Preferably, the compositions contain a disperse or dispersible form of the active compound, that is, the compositions are either liquids in which the active compounds are dispersed or dissolved, or finely divided solids in which the compounds are dispersed. In a preferred embodiment, the solid compositions are sufficiently finely divided so that more than 50 percent thereof passes a screen having 4 meshes to the inch and more than 75 percent of the active compound therein is sufficiently finely divided to pass a similar screen.

Solid compositions typically contain rumen-degradable, gastrically utilizable nutrient substances such as dextrose, sucrose, lactose, maltose, corn syrup solids, hydrolyzed cereal solids, dry milk solids, cracked or milled grains such as corn, wheat, oats, barley, and the like, dried molasses, dried sorghum, soybean meal, cottonseed meal, peanut meal, fish meal, lysine, methionine, cystine, cysteine, tryptophan, arginine, glycine, peptides and polypeptides containing lysine, cysteine, cystine, tryptophan, arginine, glycine, methionine and the like, casein, soya bean protein and the like; fat soluble vitamins, such as vitamin A, vitamin D, vitamin E or vitamin K; as well as rumen-insensitive, gastrically utilizable mineral nutrients such as ferrous salts, sodium chloride, magnesium sulfate, calcium salts, buffers and the like, and from about 0.005 to about 1 to about 2 percent by weight of one or more of the active guanidine or aminoguanidine compounds. Desirable solid compositions contain from about 0.05 to about 98 percent by weight of an essential amino acid source in the form of amino acids or salts thereof, peptides, polypeptides or proteins. Preferred protein supplement compositions contain from about 35 to about 40 to about 75 percent by weight of essential amino acid source and from about 0.05 to about 0.5 percent by weight of an active compound. Concentrate supplement compositions generally contain from about 0.5 to about 2 or more percent of an active compound, and may also contain from about 50 to about 98 percent of an essential amino acid source. The concentrate supplement concentrations are adapted to be diluted with other nutrients such as sugars or cereals prior to feeding. The supplement compositions are typically fed orally in amounts of about 1 to about 6 to about 10 grams of composition per pound of animal body weight per day, and are preferably so formulated so that en entire daily dosage of the desired supplemental nutrients is incorporated with a single dosage of from about 0.5 to about 1,000 milligrams of active compound per pound of animal body weight.

Liquid compositions typically comprise one or more of the gastrically utilizable substances set out above, and in addition thereto they comprise a liquid carrier such as water, milk, aqueous ethanol, propylene glycol, glycerine, polyethylene glycols and the like. Emulsified compositions can contain edible oils such as corn oil, peanut oil, cottonseed oil and the like, as well as surface active dispersing agents or emulsifying agents. The liquid compositions contain an esophageal-grooveclosing amount of from about 0.005 to about 1 to about 2 percent by weight of one or more of the guanidine, 1-aminoguanidine or 1,3-diaminoguanidine active compounds.

The solid and liquid compositions of the invention can also contain rumen-degradable, gastrically utilizable or rumen-insensitive, gastrically utilizable medicaments in addition to or in lieu of the nutrient substances described above. Preferred rumen-degradable, gastrically utilizable medicaments include tetrachloroethylene, nicotine sulfate and bacitracins such as bacitracin, zinc bacitracin, manganese bacitracin or bacitracin methylenedisalicylate. Preferred rumen-insensitive, gastrically utilizable medicaments include chloramphenicol, tylosin, erythromycin, penicillins and tetracyclines, such as tetracycline, oxytetracycline or chlorotetracycline.

DESCRIPTION OF THE PREFERRED EMBODIMENTS

The following examples illustrate the invention but are not to be construed as limiting the same.

EXAMPLE 1

Several groups of docile crossbred lambs of both sexes and weighing between 60 and 70 pounds each are administered an esophageal-groove-closing amount of one of the active compounds of the invention in a procedure similar to that described by Riek, Australian Vet. Jour. *30*: 29–37 (1954). The lambs are penned in groups of six lambs per group and fed a conventional hay-grain ration. Feed is withheld from the animals for 16 hours before administration of a test compound. Blood samples are taken from the jugular vein and transferred to heparinized centrifuge tubes prior to treatment. The blood samples are analyzed for glucose content. Each group of lambs is drenched with 30 milliliters of an aqueous composition containing a test compound and drenched thereafter with 60 milliliters of an aqueous solution containing 83.3 percent by weight of glucose. Drenching with glucose is carried out within 15 seconds of drenching with a test compound. Drenching with both test compound and with the glucose solution is carried out using a syringe type drenching gun with a flexible plastic extension tube to ensure contact of the test compound solutions with esophageal tissues. A similar group of similar lambs is similarly prepared as a check. The check lambs are drenched with 30 milliliters of water prior to drenching with glucose solution, and these animals are not treated with a test compound. A second blood sample is drawn from the jugular vein of each animal 1 hour after drenching with glucose, and the blood glucose concentration is determined and compared to the concentration observed prior to drenching. An average increase in blood glucose level of greater than 10 milligrams of glucose per 100 milliliters of blood is observed with each group of lambs treated with a test compound, indicating closure of the esophageal groove. The results of these observations are set out below in Table I, showing the average blood glucose levels observed prior to treatment and one hour after treatment, and the average increase in glucose level obtained with each test compound.

TABLE I

| Test Compound | Amt. Administered in mg. per 60–70 lb. Lamb | Av. blood glucose level Before treatment | Av. blood glucose level After treatment | Increase |
|---|---|---|---|---|
| | | mg. per 100 milliliters | | |
| None (check group) | — | 62.4 | 64.1 | 1.7 |
| 1-Aminoguanidine bicarbonate | 77 | 71.0 | 90.6 | 19.6 |
| 1,3-Diaminoguanidine hydrochloride | 600 | 70.8 | 93.2 | 22.4 |
| 1-Aminoguanidine hydrochloride | 55 | 61.2 | 81.9 | 20.7 |
| Guanidine chromate | 600 | 67.7 | 97.2 | 29.6 |
| Guanidine phosphate | 600 | 65.9 | 91.0 | 25.1 |
| Guanidine hydrochloride | 55 | 78.1 | 105.7 | 27.6 |

EXAMPLE 2

Separate groups of 60 to 70 pound lambs are prepared as described above in Example 1. Feed is withheld from the animals for approximately 16 hours (overnight) before feeding a test ration. Blood samples are taken from the jugular vein of each animal, transferred to heparinized centrifuge tubes prior to treatment and analyzed for blood glucose level. The sheep are then fed a dry feed test ration consisting of 35 percent by weight glucose monohydrate in a conventional feed supplement containing equal parts of corn and oats. The test rations are intimately mixed with an esophageal-groove-closing amount of a test compound prior to feeding. One-half pound of test ration is fed to each sheep. A similar check group of sheep is similarly fed an identical test ration which contains no test compound. Blood samples are taken 1.5 hours after feeding and analyzed for blood glucose concentration. The results obtained with each group are set out below in Table II.

TABLE II

| Test Ration | Av. glucose level in mg. per 100 ml. before feeding | Av. glucose level in mg. per 100 ml. 1.5 hrs. after feeding | Av. increase in glucose level in mg. per 100 ml. |
|---|---|---|---|
| 0.5 lb. test ration per Sheep | 73.3 | 77.5 | 4.2 |
| 0.5 lb. test ration + 0.083 % Guanidine Hydrochloride per Sheep | 67.5 | 83.2 | 15.7 |
| 0.5 lb. test ration + 0.167 % Guanidine Hydrochloride per Sheep | 73.7 | 93.5 | 19.8 |
| 0.5 lb. test ration + 0.184 % 1-Aminoguanidine Hydrochloride per Sheep | 61.6 | 76.1 | 14.5 |

EXAMPLE 3

Separate groups of sheep are administered a test compound and a Congo red dye indicator in drenching and feeding operations similar to those of Examples 1 and 2. A first series of separate groups of sheep are drenched with 30 milliliters of an aqueous solution containing 600 milligrams of one of guanidine phosphate or guanidine chromate or containing 55 milligrams of guanidine hydrochloride. A drenching check group is administered 30 milliliters of water. Each group in this series is then drenched within 15 to 30 seconds with 60 milliliters of aqueous 83.3 percent glucose solution containing one percent by weight of Congo red dye. A second series of sheep is fed the test ration of Example 2 containing 35 percent glucose and 1 percent Congo red dye. One such group receives one-half pound per sheep of such feed composition having 0.083 percent by weight of guanidine hydrochloride incorporated therein. A second such group receives an identical ration containing 0.167 percent guanidine hydrochloride, and a feeding check group receives an identical ration containing no test compound. Analyses of blood sugar levels before drenching or feeding and 1 hour after drenching or 1.5 hours after feeding indicate substantial increases of blood glucose in the sheep receiving the guanidine test compounds and negligible increases in the check groups of sheep. The animals are then slaughtered and a careful search of the gastro-intestinal tract is carried out in each case to determine the disposition of the Congo red dye. The Congo red dye is found in the abomasum of the drenched sheep treated with a guanidine compound and dispersed between the omasum and abomasum of the sheep receiving dry feed containing guanidine hydrochloride. In the check sheep which were treated by either drenching or feeding but without the addition of a guanidine compound, all of the dye is found in the reticulo-rumen. In other operations, similar results are obtained with cattle and with goats.

EXAMPLE 4

Separate groups of crossbred lambs and yearling wethers are prepared as test animals. A 10 by 10 centimeter square is marked on both mid-sides of each sheep and all of the wool is removed from the square patch areas with small animal clippers. All sheep are then fed an alfalfa hay diet for a base period of 3 weeks. At the end of the 3-week base period, the wool is clipped from the patch areas, cleaned, dryed, and weighed to determine the base level of wool production for each sheep. Following the 3-week base period, three groups of four sheep per group are fed 60 grams of a supplemental diet per sheep per day for 3 weeks. The supplemental diet is a dry mash high in essential amino acids and containing 78 percent soybean meal, 7.5 percent corn, 7.5 percent oats, 5 percent dried molasses solids and 2 percent DL methionine. One group of sheep receives the supplemental diet admixed with 0.16 percent by weight of guanidine hydrochloride; a second group receives the supplement admixed with 0.184 percent by weight of 1-aminoguanidine hydrochloride. A third group of sheep receives the supplemental diet alone, without any test compound. In addition, another group of four sheep receives neither a supplemental diet nor a test compound. The sheep are maintained for the additional 3-week period and are allowed to feed on the alfalfa hay ration ad libitum. At the end of the second 3-week period, the wool from the patch areas is again clipped, cleaned, dried and weighed.

The sheep receiving only the alfalfa hay ration and the sheep receiving the supplemental diet without any guanidine or 1-aminoguanidine test compound are found to have produced less wool, on a weight basis, during the second three week period than they produced during the three week base period. In contrast, the sheep receiving 60 grams per day of supplemental diet containing guanidine hydrochloride or 1-aminoguanidine hydrochloride are found to have grown over 25 percent more wool by weight during the second 3-week period than they grew during the base period in which they were fed only the alfalfa hay ration.

EXAMPLE 5

A feed supplement composition is prepared by mixing together 34 parts by weights of fish meal, 25 parts by weight of soybean meal, 5 parts by weight of each of cracked corn, barley and oats, 2 parts by weight of lysine, 2 parts by weight of methionine, 1 part by weight of cysteine, 6 parts by weight of casein, 10 parts by weight of corn syrup solids, 4.5 parts by weight of cottonseed meal and 0.5 part by weight of guanidine hydrochloride. The supplement is mixed well and vitamins A and D are added to provide 5,000 International Units of Vitamin A and 400 International Units of Vitamin D per pound of feed supplement. The supplement is adapted to be fed to cattle, feeding of the supplement being regulated so that the animals are permitted to feed thereon for a limited time daily, the feeding time being selected to provide for ingestion of about 1 gram of composition per pound of body weight.

EXAMPLE 6

A medicated composition is prepared by mixing together 60 parts by weight of soybean meal, 30 parts by weight of a mixture of equal parts of wheat, barley and oats, 5 parts of dried sorghum solids, 3 parts of casein, 0.75 part of lysine, 0.70 part of methionine, 0.55 part by weight of 1-aminoguanidine carbonate and 0.5 part by weight of oxytetracycline hydrochloride. The composition is administered orally to cattle and sheep by feeding at a dosage rate of 1 gram of composition per pound of animal body weight.

EXAMPLE 7

Yearling steers weighing about 500 to 600 pounds each are dosed with nicotine sulfate to combat hookworms. The cattle are administered 60 milliliters of an aqueous drench containing 150 milligrams of guanidine sulfate. Fifteen to 30 seconds thereafter, the animals are drenched with 120 milliliters of an aqueous solution containing 2.5 percent by weight of nicotine sulfate.

EXAMPLE 8

Two parts by weight of cysteine, 1 part by weight of tryptophan, 2 parts by weight of methionine and one part by weight of lysine are mixed together and milled with 19 parts by weight of barley, 5 parts by weight of dried molasses, 10 parts by weight of dried yeast, 10 parts by weight of oats, 49 parts by weight of soybean grits, 0.5 part by weight of 1,3-diaminoguanidine hydrochloride and 0.5 part by weight of guanidine phosphate to prepare a feed supplement. The supplement is adapted to be fed to ruminants in amounts of 50 to 75 grams per 100 pounds of body weight per day in a single feeding.

What is claimed is:

1. A method which comprises dispersing over the esophageal tissues of a ruminant animal by oral administration a compound selected from the group consisting of guanidine, 1-aminoguanidine, 1,3-diaminoguanidine and the pharmaceutically acceptable salts thereof, in an amount sufficient to induce substantial closure of the esophageal groove of the animal, and orally administering to the animal while its esophageal groove is substantially closed, an effective amount of a substance selected from medicaments and nutrients subject to a substantial reduction in efficacy on passage through the reticulo-rumen, whereby said substance is shunted to the omasum-abomasum, substantially bypassing the reticulo-rumen.

2. The method of claim 1 wherein the compound is selected from the group consisting of guanidine and the pharmaceutically-acceptable salts thereof.

3. The method of claim 1 wherein the compound is selected from the group consisting of 1-aminoguanidine and the pharmaceutically-acceptable salts thereof.

4. The method of claim 1 wherein the substance is an essential amino acid source.

5. The method of claim 1 wherein the substance is an amino acid selected from the group consisting of lysine, methionine, cystine, cysteine, tryptophan, arginine, glycine and threonine.

6. The method of claim 1 wherein a nutrient substance is administered substantially simultaneously with the compound.

7. A method which comprises dispersing over the esophageal tissues of a ruminant animal by oral administration a compound selected from the group consisting of guanidine, 1-aminoguanidine, 1,3-diaminoguanidine and the pharmaceutically acceptable salts thereof, the compound being employed in an amount of from about 0.5 to about 1,000 milligrams of compound per pound of animal body weight thereby inducing substantial closure of the esophageal groove of the animal; and orally administering to the animal an effective amount of a nutrient or medicament substance which is substantially reduced in efficacy by passage through the reticulo-rumen when administered orally, the substance being administered during a period from a time simultaneous to administration of the compound to about 5 minutes thereafter and while the esophageal groove of the animal is substantially closed, whereby said substance is shunted to the omasum-abomasum, substantially bypassing the reticulo-rumen.

8. The method of claim 7 wherein the substance administered is a medicament selected from the group consisting of tetrachloroethylene, nicotine sulfate, bacitracin, zinc bacitracin, manganese bacitracin and bacitracin methylenedisalicylate.

9. The method of claim 7 wherein the substance administered is a medicament selected from the group consisting of chloramphenicol, tylosin, erythromycin, penicillin, tetracycline, oxytetracycline and chlortetracycline.

10. The method of claim 7 wherein the substance administered is a member of the group consisting of the amino acids lysine, methionine, cystine, cysteine, tryptophan, arginine, threonine, and glycine and digestible peptides, polypeptides, and proteins containing the same.

11. The method of claim 7 wherein the compound is administered by drenching with an aqueous solution containing from about 0.005 to about 2 percent of the compound, and wherein the substance is orally administered within about two minutes following the administration of the drench.

12. A method which comprises orally administering to a ruminant animal a finely divided solid, ingestible composition comprising from about 0.005 to about 2 percent by weight of a compound selected from the group consisting of guanidine, 1-aminoguanidine, 1,3-diaminoguanidine and the pharmaceutically acceptable salts thereof, and a substance selected from the group consisting of dextrose, sucrose, lactose, maltose, corn syrup solids, hydrolyzed cereal solids, dry milk solids, cracked or milled grain, dried molasses, dried sorghum, soybean meal, cottonseed meal, peanut meal, fish meal, lysine, methionine, cystine, cysteine, tryptophan, arginine, glycine, peptides and polypeptides containing lysine, cysteine, cystine, tryptophan, arginine, glycine, or methionine, casein, soya bean protein, vitamin A, vitamin D, vitamin E, and vitamin K; the composition being administered in an amount sufficient to provide from about 0.5 to about 1,000 milligrams of said compound per pound of animal body weight, whereby said substance is shunted to the omasum-abomasum, substantially bypassing the reticulo-rumen.

13. The method of claim 12 wherein the compound is guanidine hydrochloride.

14. The method of claim 12 wherein the composition is administered in an amount sufficient to provide from about 0.5 to about 25 milligrams of compound per pound of animal body weight.

* * * * *